(12) United States Patent
Fujita

(10) Patent No.: US 11,639,192 B2
(45) Date of Patent: May 2, 2023

(54) DETECTION UNIT

(71) Applicant: DENSO CORPORATION, Kariya (JP)

(72) Inventor: Toshihiro Fujita, Kariya (JP)

(73) Assignee: DENSO CORPORATION, Kariya (JP)

( * ) Notice: Subject to any disclaimer, the term of this patent is extended or adjusted under 35 U.S.C. 154(b) by 289 days.

(21) Appl. No.: 16/823,760

(22) Filed: Mar. 19, 2020

(65) Prior Publication Data

US 2020/0307683 A1 Oct. 1, 2020

(30) Foreign Application Priority Data

Mar. 28, 2019 (JP) .............................. JP2019-062411

(51) Int. Cl.
*B62D 5/04* (2006.01)
*G01M 17/06* (2006.01)

(52) U.S. Cl.
CPC ........... *B62D 5/0481* (2013.01); *G01M 17/06* (2013.01)

(58) Field of Classification Search
CPC .... B62D 5/0481; B62D 5/0484; B62D 5/049; B62D 5/046; B62D 15/0235; G01M 17/06; H02K 2211/03; H02K 11/02; H02K 11/215; H02K 11/27; H02K 11/30;
(Continued)

(56) References Cited

U.S. PATENT DOCUMENTS 5,351,555 A * 10/1994 Garshelis ................ G01L 3/103
336/30

6,791,219 B1 * 9/2004 Eric ...................... H02K 11/215
310/68 B
11,021,185 B2 * 6/2021 Kim ................... B62D 15/0235
(Continued)

FOREIGN PATENT DOCUMENTS

AT 516146 A4 * 3/2016 ............. B21D 5/006
CN 1477626 A * 2/2004 ........... G11B 7/0945
(Continued)

OTHER PUBLICATIONS

"Development of steering wheel angle sensor used for torque coordinating control of in-wheel motor driven electric vehicle;" Li Hao, Xu Yanliang, Zhang Yun, Li Yuandong; 2011 International Conference on Electrical Machines and Systems (pp. 1-3); Aug. 1, 2011. (Year: 2011).*

(Continued)

*Primary Examiner* — Khoi H Tran
*Assistant Examiner* — Jorge O Peche
(74) *Attorney, Agent, or Firm* — Maschoff Brennan

(57) ABSTRACT

A detection unit has a detection element for detecting a change of magnetic field according to a rotation of a magnet, and an angle calculator for calculating an angle signal according to a detected physical quantity detected by the detection element. Further, a storage stores a plurality of correction values for correcting detection error of the angle signal, and another storage stores a plurality of correction values for correcting detection error of the angle signal. An abnormality determiner determines abnormality of the correction values, an another abnormality determiner determines abnormality of the correction values. A control calculator performs a control calculation by using the angle signals corrected by using the correction value having been determined as normal.

6 Claims, 9 Drawing Sheets

(58) Field of Classification Search
CPC ...... H02K 11/33; G01D 3/0365; G01D 5/145; H02P 6/16

See application file for complete search history.

(56) References Cited

U.S. PATENT DOCUMENTS

| | | | | |
|---|---|---|---|---|
| 11,104,375 B2* | 8/2021 | Nakamura | ............ | H02P 25/024 |
| 11,440,582 B2* | 9/2022 | Uematsu | ............... | B62D 15/021 |
| 2002/0148675 A1* | 10/2002 | Higashira | ............... | G01L 5/221 |
| | | | | 180/446 |
| 2005/0125124 A1* | 6/2005 | Nagase | .................. | B62D 5/046 |
| | | | | 701/41 |
| 2006/0001394 A1* | 1/2006 | Yukumatsu | ............ | B62D 5/046 |
| | | | | 318/632 |
| 2009/0030575 A1* | 1/2009 | Kleinau | ............... | B62D 5/0472 |
| | | | | 701/44 |
| 2011/0148336 A1* | 6/2011 | Hayashi | .............. | H02P 21/0003 |
| | | | | 318/400.04 |
| 2011/0246133 A1* | 10/2011 | Harada | .................. | G01D 5/145 |
| | | | | 324/207.14 |
| 2011/0320154 A1* | 12/2011 | Wakizaka | ............ | G01D 5/2451 |
| | | | | 702/94 |
| 2012/0078560 A1* | 3/2012 | Satou | ................ | B62D 15/0235 |
| | | | | 702/94 |
| 2014/0246997 A1* | 9/2014 | Suzuki | ...................... | H02P 6/16 |
| | | | | 318/400.04 |
| 2015/0019152 A1* | 1/2015 | Scheibenzuber | .... | G01D 5/2448 |
| | | | | 702/94 |
| 2015/0226627 A1* | 8/2015 | Kuwahara | ............... | G01L 3/105 |
| | | | | 701/41 |
| 2015/0239501 A1* | 8/2015 | Fujita | .................. | B62D 15/021 |
| | | | | 701/41 |
| 2016/0231142 A1* | 8/2016 | Kawano | ................. | B62D 5/049 |
| 2016/0362137 A1* | 12/2016 | Taki | ..................... | B62D 15/025 |
| 2017/0029022 A1* | 2/2017 | Nakamura | ............. | B62D 5/049 |
| 2017/0254666 A1* | 9/2017 | Ikeda | ................. | G01D 5/2449 |
| 2017/0315514 A1* | 11/2017 | Kitamoto | ................. | B62D 5/046 |
| 2018/0216965 A1* | 8/2018 | Richard | ................. | G01R 33/09 |
| 2019/0152524 A1* | 5/2019 | Fujita | ....................... | G01D 5/14 |
| 2019/0291775 A1* | 9/2019 | Taki | ..................... | B62D 5/0481 |
| 2019/0367093 A1* | 12/2019 | Suzuki | .................. | G01L 5/221 |
| 2019/0368901 A1* | 12/2019 | Fujita | ..................... | B62D 5/0481 |
| 2020/0031352 A1* | 1/2020 | Takaki | .................. | B60W 40/02 |
| 2020/0070872 A1* | 3/2020 | Ushiro | ................. | B62D 5/0481 |
| 2020/0307682 A1* | 10/2020 | Fujita | ..................... | B62D 5/049 |
| 2020/0307683 A1* | 10/2020 | Fujita | ........................ | H02P 6/16 |
| 2020/0309566 A1* | 10/2020 | Fujita | ..................... | G01L 5/221 |
| 2021/0052808 A1* | 2/2021 | Tanneberg | ............ | A61M 5/142 |
| 2021/0323603 A1* | 10/2021 | Mori | ...................... | B62D 6/002 |
| 2021/0336568 A1* | 10/2021 | Ikeda | ....................... | H02P 6/16 |
| 2021/0354756 A1* | 11/2021 | Nishioka | ............... | G01D 18/00 |
| 2022/0178726 A1* | 6/2022 | Robinson | ............. | G01S 13/931 |

FOREIGN PATENT DOCUMENTS

| | | | | |
|---|---|---|---|---|
| CN | 101332834 A | * | 12/2008 | ............. B62D 5/046 |
| CN | 102365817 A | * | 2/2012 | ......... G01D 5/24452 |
| CN | 102916641 A | * | 2/2013 | ............. B62D 5/046 |
| CN | 105667584 A | * | 6/2016 | ............ B62D 5/0484 |
| CN | 103946673 B | * | 8/2016 | ............ B62D 5/0463 |
| CN | 107922000 A | * | 4/2018 | ............ B62D 5/0409 |
| CN | 107949985 A | * | 4/2018 | ............ B62D 15/021 |
| CN | 109217750 A | * | 1/2019 | ................ H02P 8/00 |
| CN | 107207037 B | * | 8/2019 | ......... B62D 15/0215 |
| CN | 105674873 B | * | 11/2019 | ............. G01B 7/30 |
| CN | 106394669 B | * | 12/2019 | ........... B62D 5/0409 |
| CN | 110072760 B | * | 5/2021 | ......... B62D 15/0235 |
| CN | 113086001 A | * | 7/2021 | ............. B62D 5/046 |
| CN | 114200480 A | * | 3/2022 | |
| CN | 111527383 B | * | 4/2022 | |
| DE | 10041096 A1 | * | 3/2002 | .......... G01D 18/008 |
| DE | 102005024879 A1 | * | 12/2006 | ........... G01D 5/2448 |
| DE | 112016002224 T5 | * | 5/2018 | ............. B62D 5/046 |
| DE | 102019203570 A1 | * | 9/2019 | ............. B62D 5/046 |
| DE | 102019121392 A1 | * | 2/2021 | ............. G01B 21/22 |
| DE | 102008055875 B4 | * | 8/2021 | ............. B62D 5/046 |
| EP | 1679246 A2 | * | 7/2006 | ............. B62D 5/049 |
| EP | 1830155 A1 | * | 9/2007 | ......... B62D 15/0215 |
| EP | 1975041 A2 | * | 10/2008 | ............ B60G 7/003 |
| EP | 3029424 A1 | * | 6/2016 | ............... G01B 7/30 |
| EP | 3156308 A1 | * | 4/2017 | ............... B62D 3/12 |
| JP | 2757435 B2 | * | 5/1998 | |
| JP | H10-197367 A | | 7/1998 | |
| JP | 2001012967 A | * | 1/2001 | ............... G01C 1/02 |
| JP | 2001-290710 A | | 10/2001 | |
| JP | 2005130578 A | * | 5/2005 | ............. B62D 5/046 |
| JP | 2005-319931 A | | 11/2005 | |
| JP | 2005319931 A | * | 11/2005 | |
| JP | 2006029937 A | * | 2/2006 | |
| JP | 2007261548 A | * | 10/2007 | ......... B62D 15/0215 |
| JP | 2011135641 A | | 7/2011 | |
| JP | 2013013286 A | * | 1/2013 | ............ B60L 15/025 |
| JP | 5339094 B2 | | 11/2013 | |
| JP | 2014139054 A | * | 7/2014 | |
| JP | 2016090331 A | * | 5/2016 | ................ B62D 6/10 |
| JP | 5958572 B2 | | 8/2016 | |
| JP | 6095845 B2 | | 3/2017 | |
| JP | 6127560 B2 | * | 5/2017 | |
| JP | 2017191093 A1 | | 10/2017 | |
| JP | 2018197737 A | * | 12/2018 | |
| JP | 2018197738 A | * | 12/2018 | |
| JP | 2020165951 A | * | 10/2020 | ............... G01D 5/14 |
| JP | WO2020129144 A1 | * | 10/2021 | |
| KR | 20060125609 A | * | 12/2006 | |
| WO | WO-0251143 A1 | * | 6/2002 | ........... G06T 3/4007 |
| WO | WO-2015107601 A1 | * | 7/2015 | .......... B60W 50/029 |
| WO | WO-2016031377 A1 | * | 3/2016 | ............ B62D 5/0481 |
| WO | WO-2016132776 A1 | * | 8/2016 | ......... B62D 15/0215 |
| WO | WO-2017026261 A1 | * | 2/2017 | ............ B62D 5/0409 |
| WO | WO-2018219562 A1 | * | 12/2018 | ............ B62D 15/025 |
| WO | WO-2019142875 A1 | * | 7/2019 | ............... B62D 5/04 |
| WO | WO-2019216022 A1 | * | 11/2019 | ............ B62D 5/0409 |
| WO | WO-2021065714 A1 | * | 4/2021 | |
| WO | WO-2021166682 A1 | * | 8/2021 | |

OTHER PUBLICATIONS

"The Optimal Current Ratio Control of Redundant Electric Drive Systems and Diagnostic Strategies for Disagreement;" Youngwoo Noh, Wonkyu Kim, Ju Lee; IEEE Access (vol. 9, pp. 32115-32130); Jan. 1, 2021. (Year: 2021).*

"Non-conduct steering sensor for Electric Power Steering;" Wang Xiaoling, Zhao Yan, Wang Hong; 2009 International Conference on Information and Automation (pp. 1462-1467); Jun. 1, 2009. (Year: 2009).*

* cited by examiner

DETECTION UNIT

CROSS REFERENCE TO RELATED APPLICATION

The present application is based on and claims the benefit of priority of Japanese Patent Application No. 2019-062411, filed on Mar. 28, 2019, the disclosure of which is incorporated herein by reference.

TECHNICAL FIELD

The present disclosure generally relates to a detection unit.

BACKGROUND INFORMATION

In the related art, a rotation angle sensor for detecting a rotation position of a rotor is known. The rotation angle sensor has a detection error depending on the assembly accuracy. For example, in the related art, a no-load steady rotation state in which the γ-axis current becomes "0" is created, and an angular error which is an assembly offset angle is calculated as a correction value from a voltage equation of the γ-δ axis.

The correction value of the rotation angle sensor is stored, for example, in a storage area or the like, which is susceptible to abnormality of the stored correction value due to data corruption or the like. In an operation scheme of using a default value for the continuation of detection when the correction value becomes abnormal, high-accuracy assembly of the rotation angle sensor and the like is still required so that the default value has a certain degree of detection accuracy. In addition, even when the assembly is performed with high accuracy, detection using the default value has lower detection accuracy than detection using the correction value.

SUMMARY

It is an object of the present disclosure to provide a detection unit capable of securing detection accuracy even when an abnormality occurs in a correction value.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
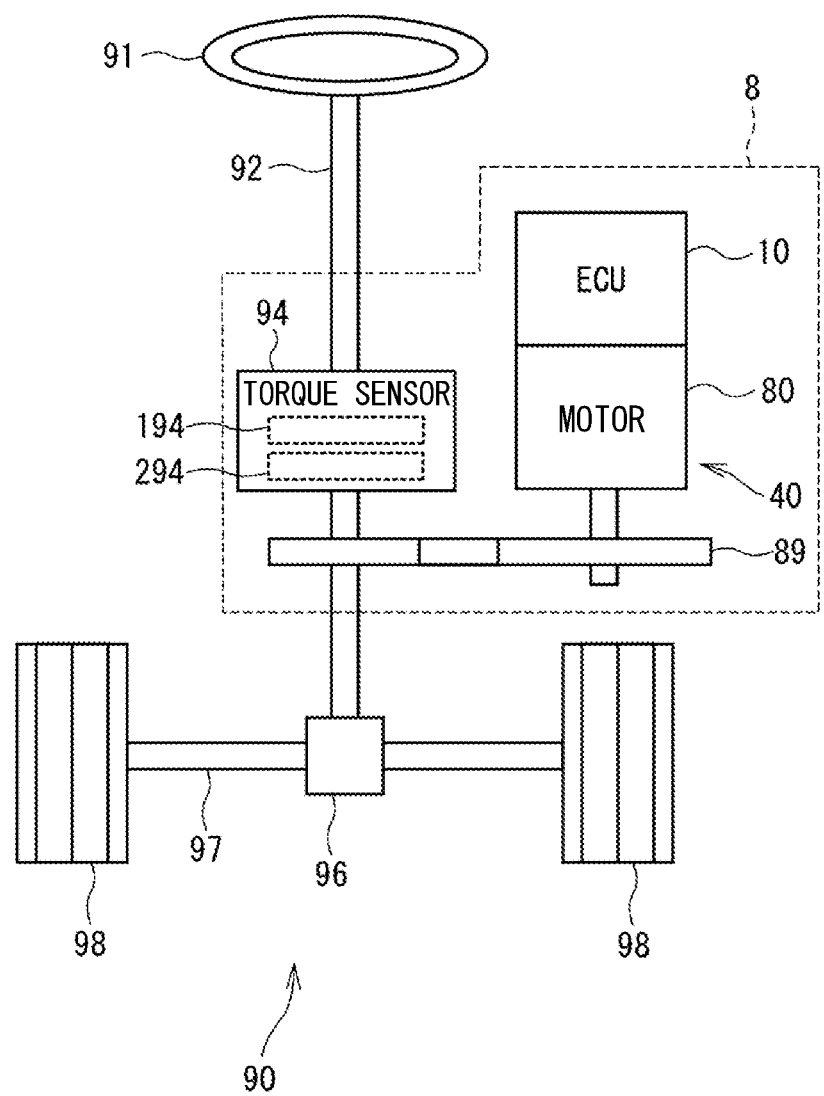
FIG. 1 is a schematic configuration diagram of a steering system according to a first embodiment.

Hereinafter, a detection unit according to the present disclosure is described based on the drawings. In the following plural embodiments, substantially same structural configurations are designated with the same reference numerals thereby to simplify the description.

First Embodiment

The detection unit according to the first embodiment is shown in FIGS. 1 to 8. As shown in FIG. 1, an ECU 10 as a detection unit is applied to an electric power steering apparatus 8 for assisting a steering operation of a vehicle together with a motor 80 which is a rotating electric machine. FIG. 1 shows an overall configuration of a steering system 90 including the electric power steering apparatus 8. The steering system 90 includes a steering wheel 91, a steering shaft 92, a pinion gear 96, a rack shaft 97, road wheels 98, the electric power steering apparatus 8 and the like.

The steering wheel 91 is connected to the steering shaft 92. A torque sensor 94 is provided on the steering shaft 92 to detect a steering torque. The torque sensor 94 includes a first torque detection unit 194 and a second torque detection unit 294. The pinion gear 96 is provided at an axial end of the steering shaft 92. The pinion gear 96 meshes with the rack shaft 97. A pair of road wheels 98 is coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The pair of road wheels 98 is steered to an angle corresponding to the displacement amount of the rack shaft 97.

The electric power steering apparatus 8 includes a drive device 40, which includes the motor 80 and the ECU 10, and a speed-reduction gear 89 or the like as a power transmission mechanism that reduces the rotation speed of the motor 80 and transmits the rotation to the steering shaft 92. The electric power steering apparatus 8 of the present embodiment is a column assist type, but it may alternatively be a rack assist type that transmits the rotation of the motor 80 to the rack shaft 97. In the present embodiment, the steering shaft 92 corresponds to a driven object.

Figure 2:
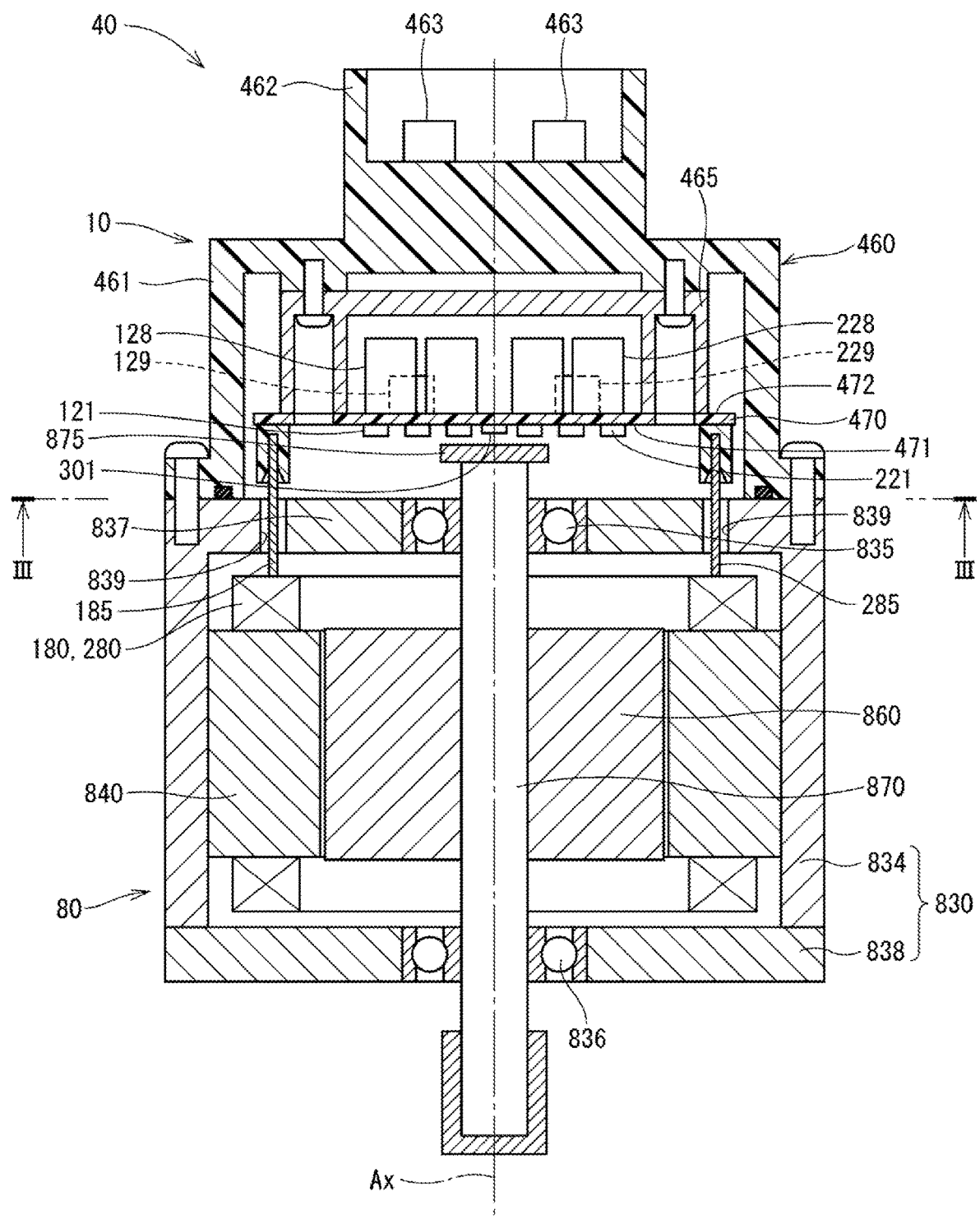
FIG. 2 is a cross-sectional view of a drive device according to the first embodiment.
Figure 3:
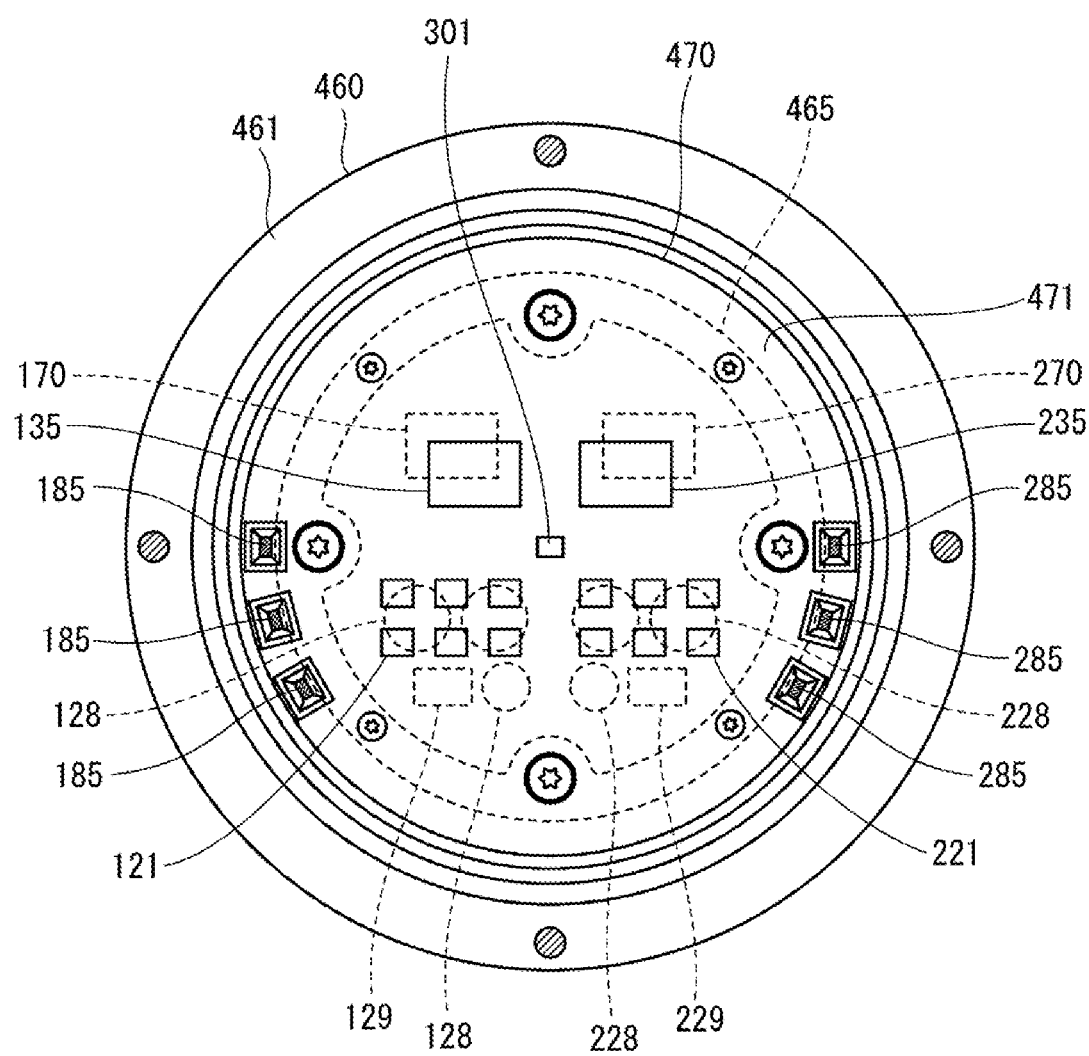
FIG. 3 is a cross-sectional view taken along a line III-III in FIG. 2.

As shown in FIGS. 2 and 3, the motor 80 outputs part or all of the torque required for steering, and is driven by the supply of electric power from a battery (not shown) to drive the speed-reduction gear 89 in a forward and backward rotation. The motor 80 is a three-phase brushless motor and has a rotor 860 and a stator 840 as shown in FIG. 2.

The motor 80 has a first motor winding 180 and a second motor winding 280 as a winding set. The motor windings 180 and 280 have the same electrical characteristics, and are cancel-wound around the common stator 840 at a shift of an electrical angle of 30 [deg] from each other. Correspondingly, phase currents are controllably supplied to the motor windings 180 and 280 such that the phase currents have a phase difference φ of 30 degrees. By optimizing a current supply phase difference, the output torque is improved. It may also reduce a sixth-order torque ripple. Further, since the electric current is averaged among the motor windings by the supply of electric current with phase difference, benefits of cancellation of noise and vibration are maximized. Further, since heat generation is also averaged among the motor windings (i.e., among two systems of motor winding and other components), temperature-dependent inter-system error regarding the detection value of each sensor and the torque is reducible while suppliable electric current is averaged among the two systems. Note that the electrical characteristics of the motor windings 180 and 280 may be different from each other.

Hereinafter, the configuration of a first drive circuit 120 and the like related to a drive control of the first motor winding 180 will be referred to as the first system L1, and the configuration of a second drive circuit 220 and the like related to a drive control of the second motor winding 280 will be referred to as a second system L2. Further, the configuration related to the first system L1 is basically indicated with reference numbers of 100, and the configuration related to the second system L2 is basically indicated with reference numbers of 200. In the first system L1 and the second system L2, same or similar configuration is indicated with same reference numbers in the least significant two digits. Further, when appropriate, the term "first" is indicated with a suffix "1," and the term "second" is indicated with a suffix "2."

In the drive device 40, the ECU 10 is integrally provided on one axial end of the motor 80, which may bear a name of mechanism-circuit integrated type drive device. However, the motor 80 and the ECU 10 may also be disposed separately from each other. The ECU 10 is disposed coaxially with an axis Ax of a shaft 870 on one side opposite to an output shaft of the motor 80. The ECU 10 may alternatively be disposed on an output shaft side of the motor 80. By adopting the mechanism-circuit integrated type configuration, an efficient arrangement of the ECU 10 and the motor 80 in a restricted installation space of the vehicle is realized.

The motor 80 includes the stator 840, the rotor 860, a housing 830 which houses the stator 840 and the rotor 860 therein and the like. The stator 840 is fixed to the housing 830 and the motor windings 180 and 280 are wound thereon. The rotor 860 is provided at a radial inside of the stator 840 to be rotatable relative to the stator 840.

The shaft 870 is fitted in the rotor 860 to rotate integrally with the rotor 860. The shaft 870 is rotatably supported by the housing 830 by bearings 835 and 836. An end portion of the shaft 870 on the ECU 10 side protrudes from the housing 830 toward the ECU 10. A magnet 875 is provided at an axial end of the shaft 870 on the ECU 10 side. The center of the magnet 875 is disposed on the axis Ax.

The housing 830 includes a bottomed cylindrical case 834, which has a rear frame end 837, and a front frame end 838 provided on an open side of the case 834. The case 834 and the front frame end 838 are fastened to each other by bolts or the like. Lead wire insertion holes 839 are formed in the rear frame end 837. Lead wires 185 and 285 connected to each phase of the motor windings 180 and 280 are inserted through the lead wire insertion holes 839. The lead wires 185 and 285 are taken out from the lead wire insertion holes 839 toward the ECU 10, and are connected to a circuit board 470.

The ECU 10 includes a cover 460, a heat sink 465 fixed to the cover 460, the circuit board 470 fixed to the heat sink 465, other electronic components mounted on the circuit board 470 and the like.

The cover 460 is provided to protect the electronic components from external impacts and to prevent dust and water from entering into an inside of the ECU 10. In the cover 460, a cover main body 461 and a connector member 462 are integrally formed. Note that the connector member 462 may alternatively be separated from the cover main body 461. Terminals 463 of the connector member 462 are connected to the circuit board 470 via a wiring (not shown) or the like. The number of connectors and the number of terminals may be changed in correspondence to the number of signals and the like. The connector member 462 is provided at an end portion in the axial direction of the drive device 40, and is open on one side opposite to the motor 80.

The circuit board 470 is, for example, a printed circuit board, and is positioned to face the rear frame end 837. On the circuit board 470, electronic components for two systems are mounted in two separate regions for each system. Nota that, although shared electronic components shared among the two systems are mounted on a single circuit board 470 in the present embodiment, such electronic components may also be mounted on (i.e., distributed among) a plurality of circuit boards.

Of two principal surfaces of the circuit board 470, one surface facing the motor 80 is referred to as a motor-side surface 471, and the other surface opposite to the motor 80 is referred to as a cover-side surface 472. As shown in FIG. 3, on the motor-side surface 471, switching elements 121 constituting the drive circuit 120, switching elements 221 constituting the drive circuit 220, angle sensors 126, 226, custom ICs 135, 235 and the like are mounted. The angle sensors 126, 226 are mounted at positions facing the magnet 875 so as to be able to detect a change in the magnetic field caused by the rotation of the magnet 875.

On the cover-side surface 472, capacitors 128, 228, inductors 129, 229, and microcomputers forming the controllers 170, 270 are mounted. In FIG. 3, reference numerals 170 and 270 are assigned to the microcomputers provided as the controllers 170 and 270, respectively. The capacitors 128 and 228 smoothen electric power input from batteries 101 and 201 (not shown). Further, the capacitors 128 and 228 assist electric power source to the motor 80 by storing electric charge therein. The capacitors 128, 228 and the inductors 129, 229 provide filter circuits, respectively, to reduce noises transmitted from other devices which share the battery, and also to reduce noises transmitted to the other devices, which share the battery, from the drive device 40. Although not shown in FIG. 3, power source relays 122 and 222, motor relays 125 and 225, current sensors 127 and 227, and the like are also mounted on the motor-side surface 471 or the cover-side surface 472.

Figure 4:
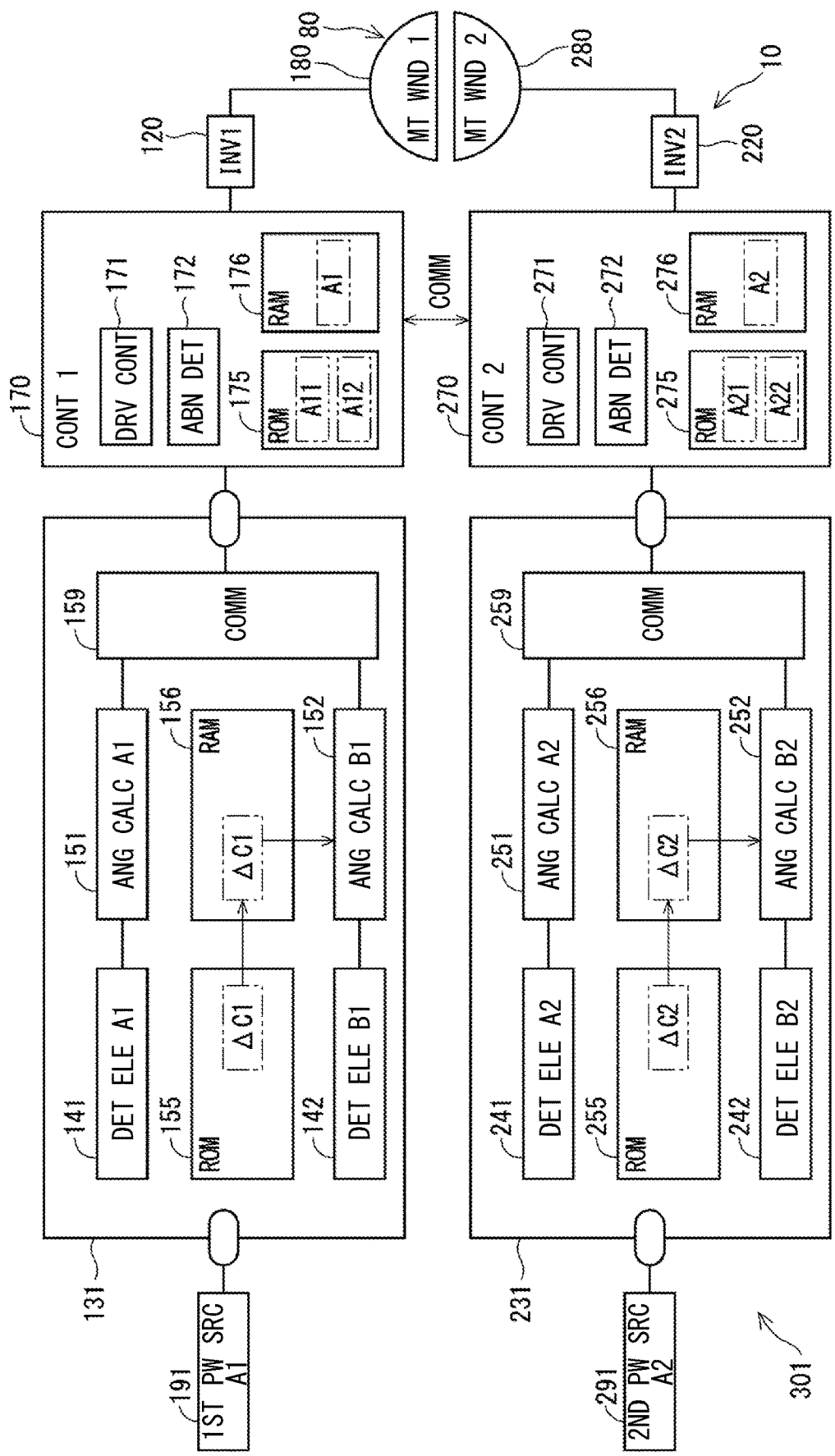
FIG. 4 is a block diagram of an electronic control unit (ECU) according to the first embodiment.

As shown in FIG. 4, the ECU 10 includes the drive circuits 120 and 220, the controllers 170, 270, a rotation angle sensor 301, and the like. In FIG. 4, the drive circuit, which is generally an inverter, is designated as "INV." The first drive circuit 120 is a three-phase inverter having six switching elements 121, which converts the electric power supplied to the first motor winding 180. The second drive circuit 220 is a three-phase inverter having six switching elements 221, which converts the electric power supplied to the second motor winding 280. The on/off operation of the switching elements 121 and 221 is controlled based on a control signal output from the first controller 170.

The rotation angle sensor 301 includes a first sensor unit 131 and a second sensor unit 231. The first sensor unit 131 outputs the detection value to the first controller 170, and the second sensor unit 231 outputs the detection value to the second controller 270. The sensor units 131 and 231 may have separate packages or may have one package. Since the sensor units 131 and 231 have the same configuration, the first sensor unit 131 is mainly described in the following, and the description of the second sensor unit 231 is omitted as appropriate.

The first sensor unit 131 includes a main detection element 141, a sub detection element 142, angle calculation units 151 and 152, storage units 155 and 156, and a communication unit 159, and receives a supply of electric power from the first power source 291 when a start switch such as an ignition switch of a vehicle not shown is turned on. The first power source 291 is, for example, a constant voltage power source such as a regulator. Hereinafter, the start switch is appropriately described as "IG."

The detection elements 141 and 142 detect changes in the magnetic field of the magnet 875 according to the rotation of the motor 80, and are implemented, for example, as a magneto-resistive element such as an AMR sensor, a TMR sensor, a GMR sensor, a Hall element or the like. The detection elements 141 and 142 preferably have respectively different sensor characteristics from each other. For example, the detection element 141 is an AMR element, and the detection element 142 is a TMR element. Here, it may also be considered as having a different element configuration related to the sensor element when, for example, difference is seen in sensor layout, in sensor material combination ratio, in production lot, in wafer number of the lot, or in a chip position in the same wafer, even when the element type is the same. Further, it may also be considered as having a different element configuration when difference is seen not only in the element but also in a surrounding circuit and the like, such as the detection circuit and the arithmetic circuit connected to the sensor element, and in the type and voltage of the power source supplied to the sensor element. By using the elements having different sensor characteristics, a common cause failure such as a magnetic flux density abnormality is avoidable, which is preferable from the viewpoint of functional safety. Hereinafter, as appropriate, "A1" is attached to the configuration of the detection element 141 and values related to the detection element 141, and "B1" is attached to the configuration of the detection element 142 and values related to the detection element 142.

Here, the detection elements 141 and 142 are denoted as "main" and "sub" in order to distinguish the two elements. In the present embodiment, the main detection element 141 is used for control, and the sub detection element 142 is used for abnormality monitoring. However, they may be functionally equivalent. The same applies to the detection elements 241 and 242 (i.e., "A2" attached to the element 241, and "B2" attached to the element 242).

The angle calculation unit 151 calculates an angle signal DA1 based on the detection value of the detection element 141 that has been AD-converted by an AD conversion unit (not shown). The angle calculation unit 152 calculates an angle signal DB1 based on the detection value of the detection element 142 that has been AD-converted by the AD conversion unit (not shown). The angle signals DA1 and DB1 are values corresponding to the rotation angle of the rotor 860, which may be any value that can be converted to the rotation angle. In the present embodiment, the angle signal DA1 is "for control" used for drive control of the motor 80, and the angle signal DB1 is "for abnormality monitoring" used for abnormality monitoring by comparison with the angle signal DA1.

The storage unit 155 is a non-volatile memory such as a ROM (Read Only Memory), for example, and the storage unit 156 is a volatile memory such as a RAM (Random Access Memory). In the drawing, the non-volatile memory is described as "ROM," the volatile memory as "RAM," and the storage area is indicated by a two-dot chain line. The storage unit 155 stores an inter-sensor error correction value ΔC1. The storage unit 156 stores the inter-sensor error correction value ΔC1 copied from the storage unit 155 after system activation. The inter-sensor error correction value ΔC1 is a difference of the angle signal DB1 relative to the angle signal DA1, and is a value capable of compensating the detection error among the angle signals DA1 and DB1. The angle calculation unit 152 uses a value corrected by the inter-sensor error correction value ΔC1 as the angle signal DB1.

The communication unit 159 generates an output signal including both of the angle signals DA1 and DB1, and outputs the output signal to the first controller 170 by digital communication such as SPI communication. The communication method may be a method other than the SPI communication. Alternatively, the angle signals DA1 and DB1 may separately be output to the first controller 170. Here, the angle signal DB1 is output to the first controller 170 as a value after correction by the inter-sensor error correction value ΔC1. In such manner, the first controller 170 needs not perform a detection error correction regarding the angle signals DA1 and DB1.

The second sensor unit 231 includes a main detection element 241, a sub detection element 242, angle calculation units 251 and 252, storage units 255 and 256, and a communication unit 259, and receives a supply of electric power from the second power source 291 when the IG is turned on. The second power source 291 is, for example, a constant voltage power source such as a regulator. The second sensor unit 231 is the same as the first sensor unit 131, so the description is omitted as appropriate. The sensor units 131 and 231 may be provided in different packages, or may be provided in one package.

The detection elements 241 and 242 detect a change in the magnetic field of the magnet 875 according to the rotation of the motor 80, and are, for example, a magneto-resistive element such as an AMR sensor, a TMR sensor, a GMR sensor, a Hall element or the like. It may be desirable that the detection elements 241 and 242 are implemented as sensor elements having respectively different sensor characteristics.

The angle calculation unit 251 calculates an angle signal DA2 based on the detection value of the detection element 241, and the angle calculation unit 252 calculates an angle signal DB2 based on the detection value of the detection element 242. In the present embodiment, the angle signal DA2 is "for control," and the angle signal DB2 is "for abnormality monitoring."

The storage unit 255 is, for example, a non-volatile memory such as a ROM, and the storage unit 256 is, for example, a volatile memory such as a RAM. The storage unit 255 stores an inter-sensor error correction value ΔC2. The storage unit 256 stores the inter-sensor error correction value ΔC2 copied from the storage unit 255 after system activation. The inter-sensor error correction value C2 is a difference of the angle signal DB2 relative to the angle signal DA2, and is a value capable of compensating the detection error among the angle signals DA2 and DB2. The angle calculation unit 252 uses a value corrected by the inter-sensor error correction value ΔC2 as the angle signal DB2. The calculation of the inter-sensor error correction values ΔC 1 and ΔC 2 may be performed at the time of inspection of the sensor IC alone before assembly to the motor 80, may be performed after assembly to the motor 80, or both. The same applies to the inter-sensor error correction value in the embodiments described later.

Each of the controllers 170 and 270 is primarily composed as a microcomputer and the like, and internally includes, although not shown in the drawing, a CPU, a ROM, a RAM, an I/O, a bus line for connecting these components, and the like. Each process performed in the controller 170 or 270 may be software processing by an execution of a program stored in advance in a tangible memory device (that is, a computer-readable, non-transitory, tangible recording medium) such as a ROM by a CPU, or it may be hardware processing by using a dedicated electronic circuit. The controllers 170 and 270 can transmit and receive information by communication. Hereinafter, communication of the controllers 170 and 270 may be referred to as inter-(micro) computer communication as appropriate.

The first controller 170 includes a drive control unit 171, an abnormality determiner 172, and storage units 175 and 176. The drive control unit 171 controls energization of (i.e., supply of electric power to) the motor winding 180 by controlling the on/off operation of the switching element 121 of the drive circuit 120. The abnormality determiner 172 monitors abnormality of the angle signals DA1 and DB1 and correction values A11 and A12.

The storage unit 175 is a non-volatile memory such as a ROM, for example, and stores the correction values A11 and A12. The storage unit 176 is, for example, a volatile memory such as a RAM, and stores a correction value A1. The correction value A1 is a value corresponding to the correction values A11 and A12, and corrects values used for various controls such as drive control of the motor 80.

The second controller 270 includes a drive control unit 271, an abnormality determiner 272, and storage units 275 and 276. The drive control unit 271 controls the energization of the motor winding 280 by controlling the on/off operation of the switching element 221 of the drive circuit 220. The abnormality determiner 272 monitors abnormality of the angle signals DA2, DB2 and correction values A21, A22.

The storage unit 275 is a non-volatile memory such as a ROM, for example, and stores the correction values A21 and A22. The storage unit 276 is, for example, a volatile memory such as a RAM, and stores a correction value A2. The correction value A2 is a value corresponding to the correction values A21 and A22, and corrects values used for various controls such as drive control of the motor 80.

The correction values A11 and A12 are values for correcting the angle signal DA1, and the correction values A21 and A22 are values for correcting the angle signal DA2. The correction values A11, A12, A21, and A22 are respectively set to appropriate values, which enables correction of assembly error and the like, by rotating the motor 80 after the sensor units 131 and 231 are assembled to the motor 80. The calculation of the correction values A11, A12, A21, and A22 may be performed by at least one of the controllers 170 and 270, or may be performed by an external inspection device (not shown). Further, when calculation of the correction values A11, A12, A21, and A22 is performed by the controllers 170 and 270, the program or the like used for the correction value calculation may be erased after the correction value calculation.

The correction values A11 and A12 are stored in respectively different storage areas. The same value may be stored as different data. For example, data of the correction value A11 may be stored as "100100" in one storage area, and data of the correction value A12 may be stored as "011011," i.e., a bit inverted data of the value A11, in the other storage area. Further, for example, one of the correction values A11 and A12 is MSB (that is, the most significant bit) and the other is LSB (that is, the least significant bit), which may look like that data of the correction value A11 is "100100" and data of the correction value A12 is "001001." The same applies to the correction values A21 and A22.

In the sensor units 131 and 231 that detect the rotation of the motor 80, detection accuracy of the detection values of the detection elements 141, 142, 241 and 242 may deteriorate due to, for example, assembly error of the detection elements 141, 142, 241 and 242 in the sensor units 131 and 231, assembly error of the sensor units 131 and 231, on which the elements 141, 142, 241 and 242, on the substrate 470, and/or the misalignment of the sensor units 131 and 231 with the rotor 860 and the magnet 875 which are the detection object.

Therefore, after the assembly of the sensor units 131 and 231 to the motor 80, it may be desirable to store a correction value for canceling the error in the sensor units 131 and 231 or in the controllers 170 and 270. Here, in case that a plurality of detection elements are provided, for example, for abnormality detection or for a continuation of detection or detection at the time of abnormality, when correction values are set for each of the detection elements, the manufacturing time becomes long and the amount of stored data increases. Further, for example, when abnormality monitoring is performed by comparing the detection values of the detection elements, the calculation load increases because correction is performed each time the comparison is performed.

If only one correction value is provided for each detection element, even though correctness of the data is secured by error correction and/or the abnormality detection function in consideration of the data corruption, post-abnormality detection continuation is only performable by having the correction value usable as a default value, which requires very high accuracy assembling for validating control by using the default value. In addition, even when the assembly is performed with high accuracy, the detection accuracy by using the default value is deteriorated than the one performed by using the correction value.

Therefore, in the present embodiment, two correction values A11 and A12 for correcting the angle signal DA1 are stored in different areas of the storage unit 175 which is a non-volatile memory. Further, two correction values A21 and A22 for correcting the angle signal DA2 are stored in different areas of the storage unit 275 which is a non-volatile memory. As a result, even when one of the correction values becomes abnormal due to data corruption or the like, the same angle detection accuracy securable by switching from one to the other when the correction value abnormality occurs. Further, the correction values A11, A12, A21, and A22 are configured to be capable of being used in error correction and abnormality detection, respectively. More specifically, parity check, cyclic redundancy check (CRC), and the like are added to the correction values A11, A12, A21, and A22 as abnormality detection data.

In the present embodiment, the angle signals DA1 and DA2 are used for control, and the angle signals DB1 and DB2 are used for abnormality monitoring. The correction value $\Delta C1$ is stored in the first sensor unit 131 and the angle signal DB1 corrected with the correction value $\Delta C1$ is output to the first controller 170, so as not to necessitate the correction of the individual angle signals DA1, DB1 when the abnormality determiner 172 compares the angle signals DA1 and DB1. Similarly, the correction value $\Delta C2$ is stored in the second sensor unit 231 and the angle signal DB2 corrected by the correction value $\Delta C2$ is output to the second controller 270, whereby correction of the individual angle signals DA2, DB2 is not necessary when the abnormality determiner 272 compares the angle signals DA2 and DB2.

Further, it is not necessary to store the correction values of the angle signals DB1 and DB2 in the controllers 170 and 270, and it is not necessary to correct the assembly error. Note that, because the values to be transmitted to the controllers 170 and 270 are corrected by the sensor units 131 and 231, i.e., DA1=DB1 and DA2=DB2 are transmitted thereto, the angle signals DB1 and DB2 for abnormality monitoring are usable for control.

Figure 5:
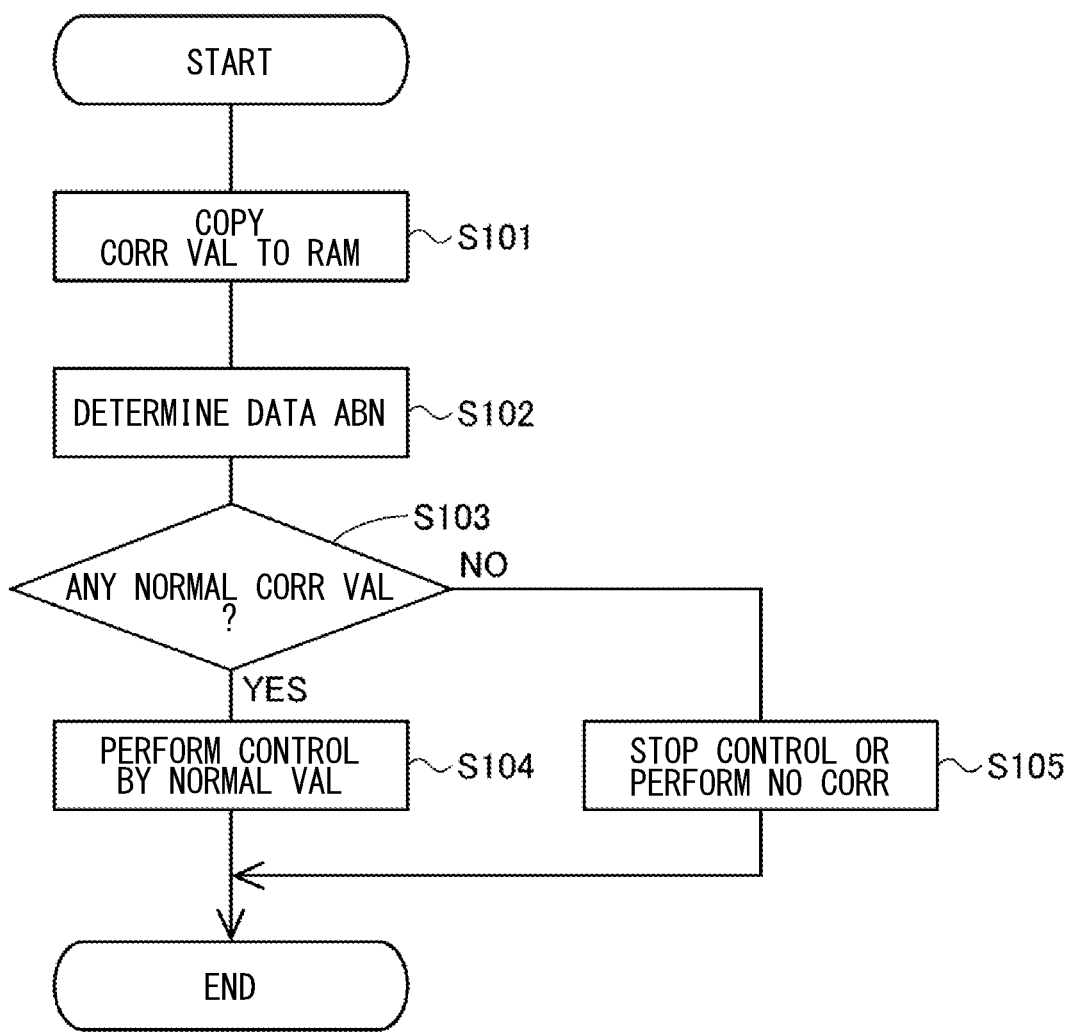
FIG. 5 is a flowchart of a correction process according to the first embodiment.

The correction process of the present embodiment is described based on the flowchart of FIG. 5. This process is performed, for example, when the controllers 170 and 270 start up, such as when the IG is switched from off to on. The processing in the controllers 170 and 270 is the same, so the processing in the first controller 170 is described in the following. For the description of the processing in the second controller 270, the value used in the following may be read as the value of the subject system. Hereinafter, "step" of step S101 is simply indicated as a symbol "S." The same applies to the other steps.

In S101, the first controller 170 copies the correction values A11 and A12 from the storage unit 175 to the storage unit 176. The correction values A11 and A12 copied to the storage unit 176 are stored as correction values A11 (RAM) and A12 (RAM).

In S102, the abnormality determiner 172 determines the presence or absence of data abnormality in the correction values A11 (RAM) and A12 (RAM). The abnormality determination method is CRC, parity check, check sum, comparison of the correction value A11 (RAM) with the correction value A12 (RAM), or the like. Here, although it is described that the number of correction values is two, when the correction value is three or more, identification and correction of the abnormal data may be performed by majority decision may additionally be performed.

In S103, the first controller 170 determines whether there is a normal correction value based on the abnormality determination result in S102. When it is determined that there is a normal correction value (S103: YES), the process proceeds to S104, and the normal correction value is copied to the correction value A1 stored in the storage unit 176 which is a volatile storage area, which serves as the correction value used for control. When it is determined that there is no normal correction value (S103: NO), the process proceeds to S105, and the drive control of the motor 80 is stopped. Alternatively, drive control of the motor 80 may be performed by using the default value (for example, 0) when the control thereof is performable by the default value with low risk influence.

As described above, the ECU 10 as the detection unit includes the sensor units 131 and 231 and the controllers 170 and 270. The sensor units 131 and 231 have the detection elements 141, 142, 241 and 242, and the controllers 170 and 270 have the storage units 175 and 275 which are non-volatile storage units, the abnormality determiners 172 and 272, and the drive control units 171, 271.

The detection elements 141, 142, 241, 242 detect a change in the magnetic field that changes in accordance with the rotation of the magnet 875 as a change in the physical quantity. The angle calculation units 151, 152, 251, 252 calculate the angle signals DA1, DB1, DA2, DB2 which are values corresponding to the physical quantities detected by the detection elements 141, 142, 241, 242.

The storage unit 175 stores a plurality of the correction values A11 and A12 for correcting a detection error with respect to the angle signal DA1. The storage unit 275 also stores the correction values A21 and A22 for correcting an angle error with respect to the angle signal DA2. The abnormality determiner 172 determines abnormality of the correction values A11 and A12, and the abnormality determiner 272 determines abnormality of the correction values A21 and A22. The drive control units 171 and 271 perform control calculation by using the angle signals DA1 and DA2 respectively corrected by using the correction value that has been determined as normal. In the present embodiment, the drive control units 171 and 271 perform drive control of the motor 80 by using the corrected angle signals DA1 and DA2.

In the present embodiment, a plurality of correction values are stored for each of the angle signals DA1 and DA2. Therefore, even when some of the correction values become abnormal due to data corruption or the like, the same detection accuracy (i.e., same accuracy level of detection) can be secured even at the data abnormal time, by switching from abnormal correction value to the correct one. That is, in other words, if at least one correction value is normal, the control is continueable without shifting to the control by using the default value, which is beneficial in terms of the assembly accuracy at the time of manufacturing of the ECU 10, i.e., the manufacturing may more easily be performable.

The detection elements include the main detection elements 141 and 241 whose detection values are used for calculation in the drive control units 171 and 271 in a normal state, and the sub detection elements 142 and 242 for the monitoring of the main detection elements 141 and 241. The correction values A11, A12, A21, A22 are values for correcting the detection error of the angle signals DA1, DA2 of the main detection elements 141, 241. Thereby, the amount of data stored in the storage units 175 and 275 is reducible as compared with the case where the correction values for all the detection elements are stored therein.

The first sensor unit 131 has the main detection element 141, the sub detection element 142, the angle calculation units 151, 152, and the storage unit 155 that stores the inter-sensor error correction value ΔC1 for correcting the detection error between the main detection element 141 and the sub detection element 142. The second sensor unit 231 has the main detection element 241, the sub detection element 242, the angle calculation units 251, 252, and the storage unit 255 that stores the inter-sensor error correction value ΔC2 for correcting the detection error between the main detection element 241 and the sub detection element 242.

The controller 170 includes the drive control units 171 and 271, the storage units 175 and 275, and the abnormality determiners 172 and 272. That is, in the present embodiment, the correction values for correcting the angle signals DA1 and DA2 related to the main detection elements 141 and 241 are stored in the storage units 175 and 275 of the controllers 170 and 270, and the inter-sensor error correction values ΔC1 and ΔC2 are stored in the storage units 155 and 255 of the sensor units 131 and 231.

The sensor units 131 and 231 correct the angle signals DB1 and DB2, which are the detection values of the sub detection elements 142 and 242, with the inter-sensor error correction values ΔC1 and ΔC2, and output the corrected values to the controllers 170 and 270. In such manner, the angle signals DA1 and DB1 acquired by the first controller 170 are values obtained by correcting the detection errors of the detection elements 141 and 142. Thus, in the calculation using both values of the angle signals DA1 and DB1 such as abnormality detection by the comparison of those values, the correction of the individual angle signals DA1 and DB1 becomes unnecessary, thereby the calculation load in the first controller 170 reducible. In addition, since it is not necessary to store a correction value related to the assembly error of the angle signal DB1, the correction time in the manufacturing is reducible compared to the case where the control unit 170 stores a correction value related to the assembly error of the angle signal DB1. Furthermore, when the angle signal DA1 becomes abnormal and the angle signal DB1 is used instead of the angle signal DA1, the angle signal DA1 may be simply replaced with the angle signal DB1. Therefore, increase of the calculation load when the angle signal DB1 is used for control is preventable. The same applies to the second controller 270.

The correction values related to the correction of the same detection value may be stored as different data. This makes it possible to avoid common cause failure. In addition, the data amount related to the correction value is reducible by setting different data lengths. The plurality of the correction values A11 and A12 related to the correction of the angle signal DA1 are stored in different storage areas of one storage unit 175. Further, the plurality of the correction values A21 and A22 related to the correction of the angle signal DA2 are stored in different storage areas of one storage unit 275. In such manner, the plurality of correction values are appropriately storable in the same storage unit.

Second Embodiment

Figure 6:
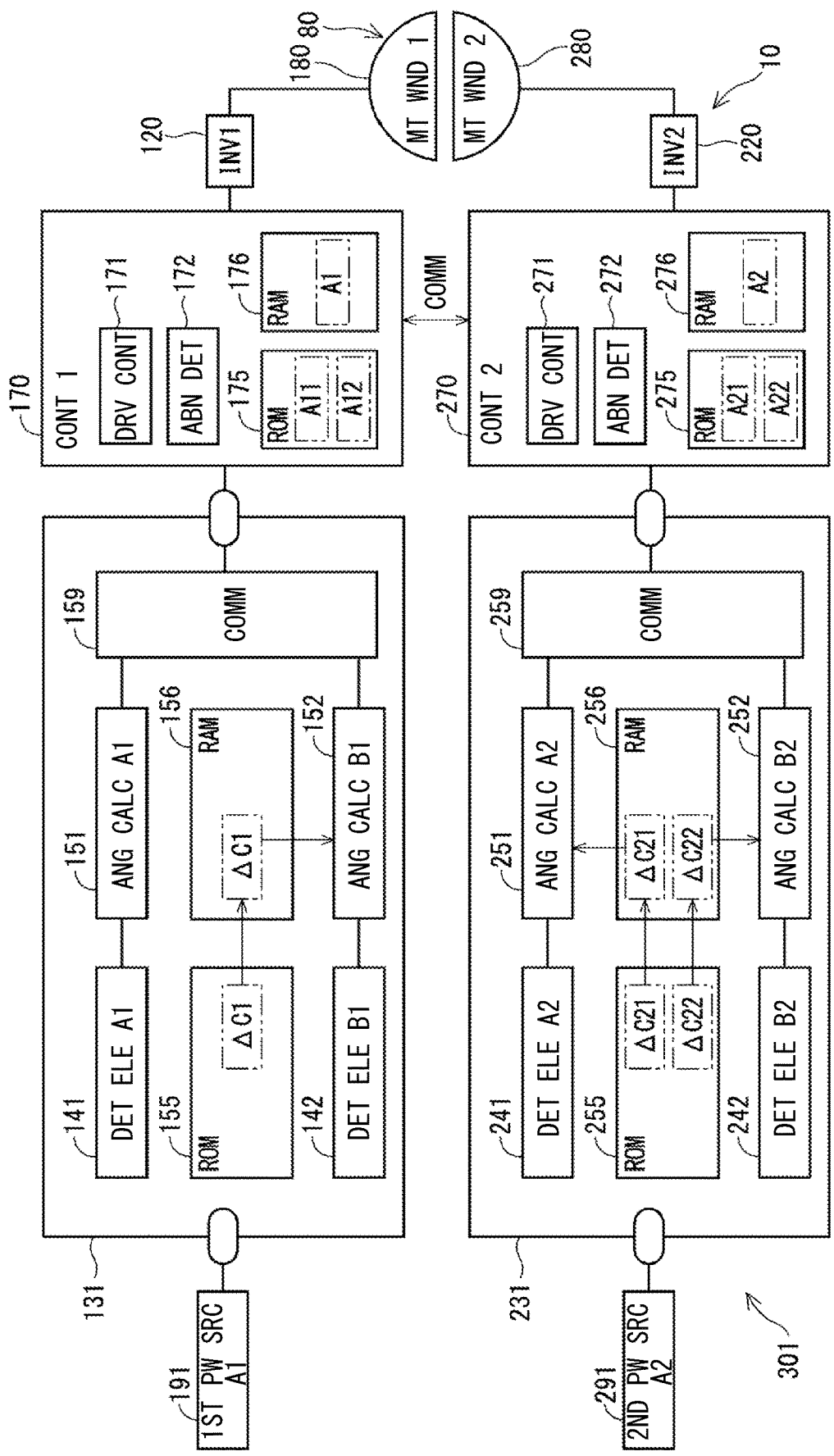
FIG. 6 is a block diagram of an ECU according to a second embodiment.

The second embodiment is shown in FIG. 6. In the present embodiment, the storage unit 255 stores an inter-sensor error correction value $\Delta C21$ that corrects an error of the angle signal DA2 with respect to the angle signal DA1, and an inter-sensor error correction value $\Delta C22$ that corrects an error of the angle signal DB2 with respect to the angle signal DA1. The inter-sensor error correction values $\Delta C\ 21$ and $\Delta C\ 22$ are copied to the storage unit 256. The angle calculation unit 251 sets a value corrected by the inter-sensor error correction value $\Delta C21$ as the angle signal DA2, and the angle calculation unit 252 sets a value corrected by the inter-sensor error correction value $\Delta C22$ as the angle signal DB2. That is, in the present embodiment, the angle signals DA2, DB1, and DB2 are all corrected to match the angle signal DA1.

Thereby, it is possible to cancel the inter-system error of the angle signals DA1 and DA2 used for control in the controllers 170 and 270. Further, since the outputs of the angle signals DA1, DB1, DA2, DB2 are the same at the normal time, the controllers 170, 270 may share the angle signals DA1, DB1, DA2, DB2 by inter-microcomputer communication, for performing abnormality monitoring by the comparison of those angles. When comparing the angle signals DA1, DB1, DA2 and DB2 shared by inter-microcomputer communication, it may be desirable that the past values of the subject system are stored and the comparison is performed between (i) the values from the other system obtained by communication and (ii) a past value of the subject system that has a matching detection timing with the value from the other system. Alternatively, for the matching of the detection timing of the value from the subject system, the other-system angle signal may be taken as a prediction value.

In the present embodiment, because the angle signal DA2 is corrected by the sensor unit 231 so as to match the angle signal DA1, the angle signals DA1 and DA2 output to the controllers 170 and 270 match with each other. Therefore, the correction values A11, A12, A21, and A22 also match with each other. Therefore, the correction values A11 and A12 may be shared by the controllers 170 and 270, by (i) omitting the correction values A12 and A22 and (ii) sending the correction values A11 and A21 by inter-microcomputer communication. In such manner, the storage area is reducible.

In the present embodiment, there are a plurality of combinations of the sensor units 131 and 231, and the controllers 170 and 270 for obtaining the angle signals DA1, DB1, DA2, and DB2 from the sensor units 131 and 231. That is, in other words, the first controller 170 obtains the angle signals DA1 and DB1 from the first sensor unit 131, and the second controller 270 obtains the angle signals DA2 and DB2 from the second sensor unit 231, making two combinations of sensor-controller pair, or two sets of sensor-controller association in the present embodiment.

The angle signals DA1, DB1, DA2, and DB2 are output from the sensor units 131 and 231 to the controllers 170 and 270 as values corrected to match one reference value in the sensor units 131 and 231. In the present embodiment, the angle signal DA1 corresponds to a "reference value," and the angle signals DB1, DA2, and DB2 are corrected to match the angle signal DA1. Note that, by having an average value of the angle signals as the reference value, for example, all of the angle signals including the angle signal DA1 may be corrected to match the reference value.

The plurality of controllers 170 and 270 share the correction values A11, A12, A21, and A22 by communication. In the present embodiment, since the angle signals output to the controllers 170 and 270 are corrected to match the angle signal DA1 which is one reference value, i.e., since the correction value is shared among the controllers, correction of individual values is not required for the comparison with the shared reference value or the like, thereby reducing the calculation load of the controllers 170 and 270. The present embodiment also provides the same advantages as those of the above embodiment.

Third Embodiment

Figure 7:
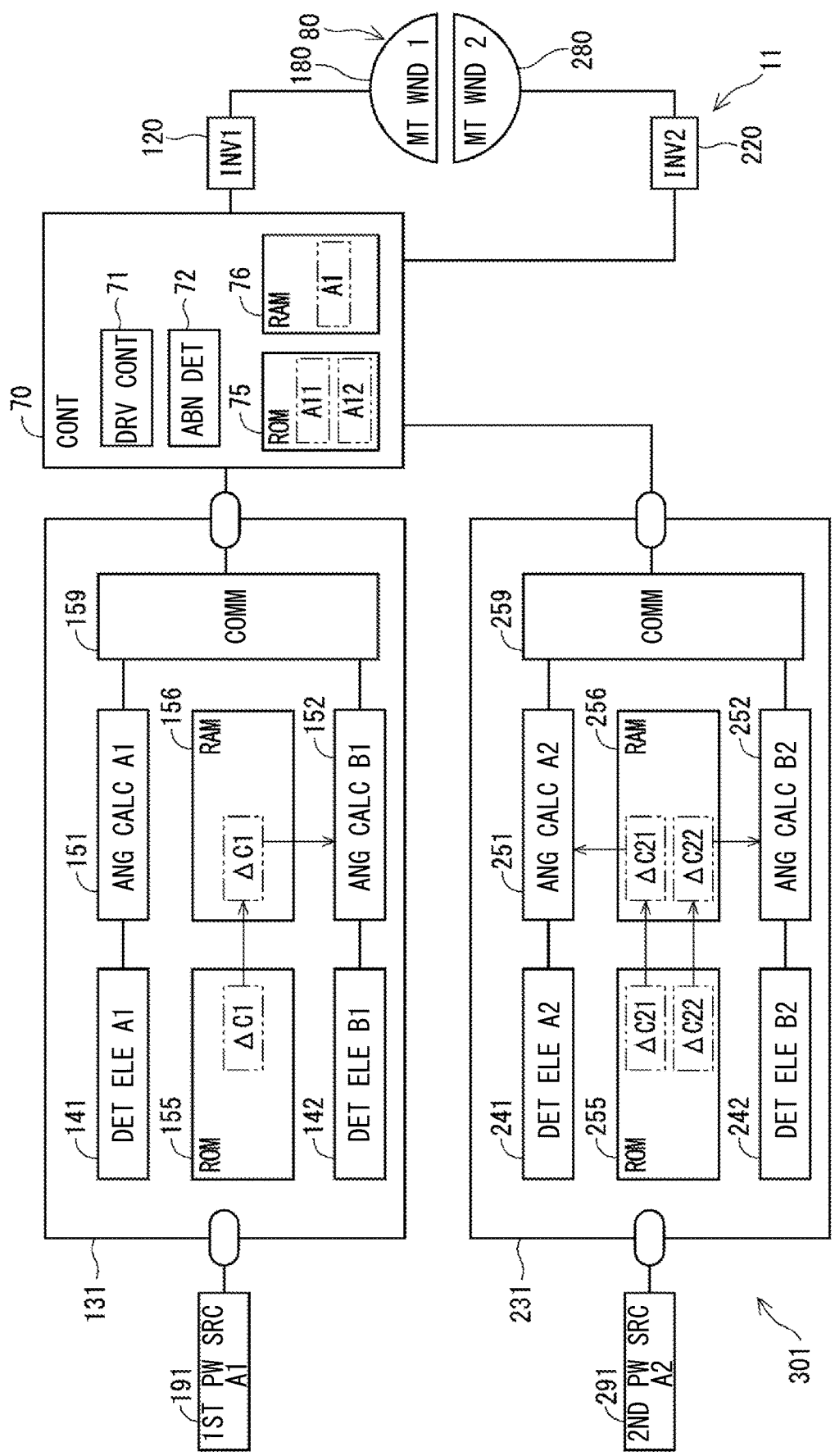
FIG. 7 is a block diagram of an ECU according to a third embodiment.

The third embodiment is shown in FIG. 7. An ECU 11 includes the drive circuits 120 and 220, a control unit 70, the rotation angle sensor 301, and the like. That is, in the present embodiment, one controller 70 acquires angle signals from the sensor units 131 and 231, and controls the drive of the motor 80.

The controller 70 includes a drive control unit 71, an abnormality determiner 72, and storage units 75 and 76. The drive control unit 71 controls the on/off operation of the switching elements 121 and 221 of the drive circuits 120 and 220, and controls energization of the motor windings 180 and 280. The abnormality determiner 72 monitors abnormality of the angle signals DA1, DB1, DA2, DB2, and the correction values A11, A12. The storage units 75 and 76 are similar to the storage units 175 and 176 of the above embodiments.

The sensor units 131 and 231 are the same as those in the second embodiment, and the angle signals DB1, DA2, and DB2 are corrected to match the angle signal DA1, and the angle signals DA1, DB1, DA2, and DB2 are output as the same value at the normal time. Therefore, it is not necessary to have a correction value for each system, and the controller 70 may have, for example, two correction values A11 and A12. This makes it possible to reduce the storage area as compared to the case of having a plurality of correction values for each system. The present embodiment also provides the same advantages as those of the above embodiment.

Fourth Embodiment

Figure 8:
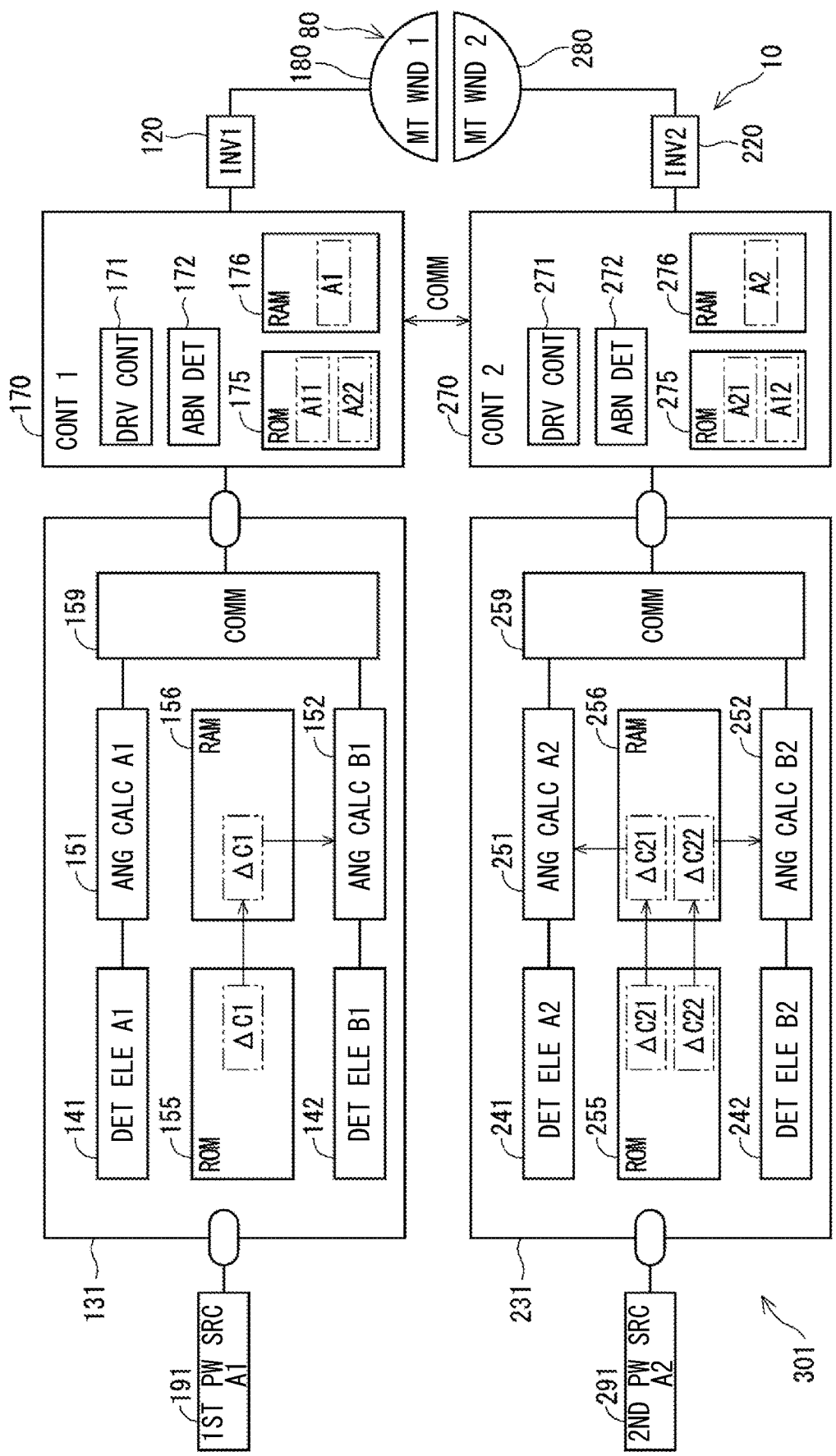
FIG. 8 is a block diagram of an ECU according to a fourth embodiment.

The fourth embodiment is shown in FIG. 8. In the present embodiment, the correction value A11 for correcting the angle signal DA1 is stored in the storage unit 175 of the first controller 170, and the correction value A12 is stored in the storage unit 275 of the second controller 270. Further, the correction value A21 for correcting the angle signal DA2 is stored in the storage unit 275 of the second controller 270, and the correction value A22 is stored in the storage unit 175 of the first controller 170. Then, by sending the correction values A12 and A22 to each other by inter-microcomputer communication, the same processing as that of the above embodiments can be performed.

In the present embodiment, there are a plurality of storage units 175 and 275 which are non-volatile storage units, and a plurality of correction values A11 and A12 related to the correction of the same angle signal DA1 are stored in the different storage units 175 and 275. Similarly, a plurality of correction values A21 and A22 related to the correction of the angle signal DA2 are stored in the different storage units 175 and 275.

In such manner, the storage areas in which the correction values A11 and A12 are stored become physically independent, and common cause failure is preventable. Further, just like in the second embodiment, i.e., when the outputs of the angle signals DA1, DB1, DA2, and DB2 at the normal time are the same value due to the correction on the sensor side, the storage area is reducible by sending only the correction values A11, A21 each other by inter-microcomputer communication, without using the values A12, A22. Although FIG. 8 shows an example in which all angle signals are matched to the angle signal DA1 as in the second embodiment, it may also possible that the angle signal DB1 is matched to the angle signal DA1 and the angle signal DB2 is matched to the angle signal DA2, as shown in the first embodiment. The present embodiment also provides the same advantage as the above-described embodiments.

Fifth Embodiment

Figure 9:
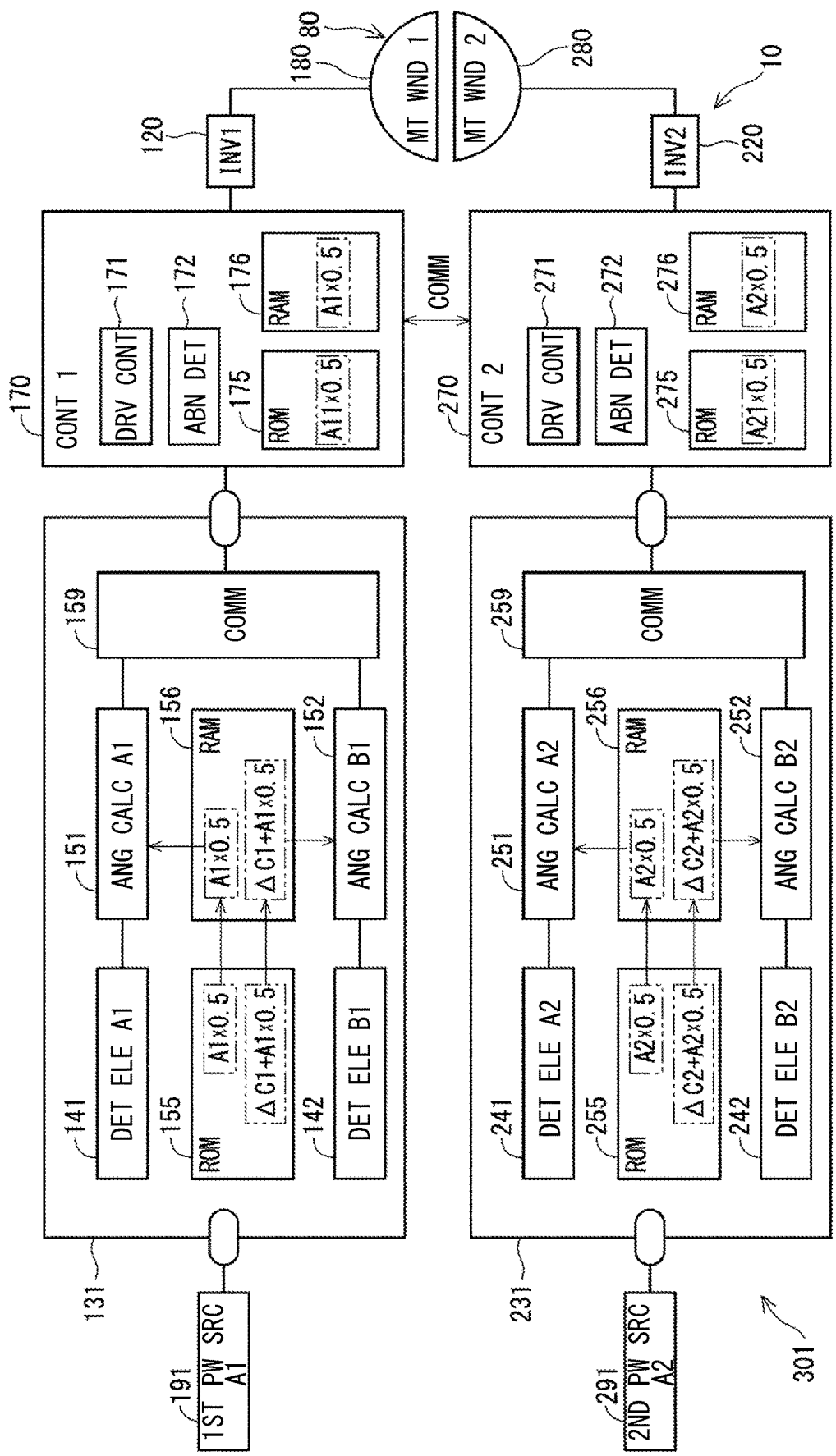
FIG. 9 is a block diagram of an ECU according to a fifth embodiment.

The fifth embodiment is shown in FIG. 9. In the present embodiment, all of the angle signals DA1, DB1, DA2, DB2 are corrected on the sensor side. In the present embodiment, one correction value is stored in each of the storage unit 175 of the first controller 170 and the storage unit 275 of the second controller 270, and the correction value is sent by inter-microcomputer communication for performing the correction process.

In the present embodiment, the correction value A1, which is a correction value used for control when the angle signal DA1 is not corrected on the sensor side, is distributed among the first controller 170 and the sensor unit 131 at a predetermined ratio. The distribution ratio of the correction value A1 is arbitrary, but here, the distribution ratio is 0.5. The correction value A11×0.5 is stored in the storage unit 175 of the first controller 170, and the correction value A1×0.5 is stored in the storage unit 176. Further, in the storage units 155 and 156 of the first sensor unit 131, the correction value A1×0.5 is stored for the correction of the angle signal DA1, and the correction value ΔC1+A1×0.5 is stored for the correction of the angle signal DB1.

The correction value A21 is stored in the storage unit 175 of the second controller 270, and the correction value A2×0.5 is stored in the storage unit 176. In addition, in the storage units 255 and 256 of the second sensor unit 231, the correction value A2×0.5 is stored for the correction of the angle signal DA2, and the correction value ΔC2+A2×0.5 is stored for the correction of the angle signal DB2.

That is, in the present embodiment, the correction value A1 is divided into a control unit side correction value and a sensor side correction value at a predetermined ratio, and the control unit side correction value is stored in the storage unit 175, and the sensor side correction value is stored in the unit 155. The correction value A2 is divided into a control unit side correction value and a sensor side correction value at a predetermined ratio, and the control unit side correction value is stored in the storage unit 275, and the sensor side correction value is stored in the storage unit 155.

In such manner, even when the correction values on the sensor units 131 and 231 become abnormal, it is still possible to perform corrections by the data distributed to the controllers 170 and 270, which secures the high detection accuracy in comparison to the correction by using the default value.

Further, when correction is performed to match the angle signal DA2 with the angle signal DA1 as shown in the second embodiment, the value used for correction of the angle signal DA2 is ΔC21+A2×0.5. In such case, for example, when the correction value A11×0.5 of the first controller 170 becomes abnormal, the correction value A21×0.5 of the second controller 270 can be used instead. Also, by setting the distribution ratio to 0.5, for example, when the correction value A1×0.5 on the sensor side becomes abnormal, the correction value in the sensor is set to 0 or to a default value, and the first controller 170 may use a two-fold value of the correction value A1×0.5 (RAM), or may add, to the correction value A1×0.5 (RAM), the correction value A2×0.5 (RAM) (i.e., a value obtained from the second controller 270) to be used for the same purpose. In such manner, even when the correction value A1×0.5 on the sensor side becomes abnormal, it is possible to secure the detection accuracy equivalent to that at the normal time. The present embodiment also provides the same advantages as the above-described embodiments.

In the above embodiments, the ECUs 10 and 11 correspond to a "detection unit," the main detection elements 141 and 241 and the sub detection elements 142 and 242 correspond to a "detection elements," and the angle calculation units 151, 152, 251 and 252 correspond to a "calculation unit." A "physical amount" is the magnetic field generated by the magnet 875, and a "detection value corresponding to the physical quantity" corresponds to the angle signals DA1, DB1, DA2, DB2. The drive control units 71, 171, and 271 correspond to a "control calculator," the storage units 75, 175, and 275 correspond to a "non-volatile storage unit," and the storage units 155 and 255 correspond to a "sensor storage."

Other Embodiments

In the above embodiments, the correction value according to the same detection value is stored in the control unit of the subject system, or in the control unit of the subject system and the other system. In other embodiments, the correction value related to the same detection value may be stored in the storage units of the first control unit, the second control unit, and the sensor, respectively. By storing the correction values in three locations, it is possible to identify abnormal data by the majority decision. Also, one or more of the correction values may be stored in an external device that can communicate with the detection unit. In the above embodiments, one correction value is copied from the storage unit 155, 255, 175, 275, which are respectively a non-volatile storage area, to the storage units 156, 256, 176, 276, which are respectively a volatile storage areas, after system activation. In other embodiments, a plurality of correction values may be stored in the non-volatile storage area by dividing an address (e.g., by multiple locations of the non-volatile storage area).

In the above embodiments, the detection element and the calculation unit are provided in the sensor unit, and the non-volatile storage, the abnormality determiner, and the control calculator are provided in the control unit. In other embodiments, the calculation unit, the non-volatile storage, the abnormality determiner, and the control calculator may be provided either in the sensor unit or in the control unit. In addition to the above, in the non-volatile area, a correction value may be stored that corrects an error generated as an order generated due to a positional shift of the sensor magnet 875.

In the above embodiments, two sensor elements are provided in one sensor unit. In other embodiments, the number of detection elements in one sensor unit may be one or three or more. In the first embodiment and the like, two control units are provided for two sensor units, and in the third embodiment, one control unit is provided for two sensor units. In other embodiments, the number of sensor units may be one or three or more. Also, the number of control units may be three or more. Also, as in the third embodiment, a plurality of sensor units may be provided for one control unit, or one sensor unit may be provided for the plurality of control units.

In the above embodiments, the detection unit is used in the electric power steering apparatus. In other embodiments, the detection unit is also applicable to a steering sensor. Further, the detection unit may suitably be applicable to an application which requires (i.e., needs to deal with) the rotation number and the rotation angle. Furthermore, if a stroke position is converted into a rotation system using a gear, it may also be applicable to a stroke sensor. Further, in the above embodiments, the control calculator controls the drive of the motor using the detection value. In other embodiments, the control calculator can perform various calculations using the detection value, depending on a device to be applied to.

In the above embodiments, the sensor unit is a rotation angle sensor that detects the rotation of the motor. In other embodiments, the present disclosure is applicable not only to the rotation angle sensor but also to a sensor that measures various physical quantities, such as a current sensor, a torque sensor, a pressure sensor, a temperature sensor, a distance sensor such as a laser displacement meter or the like.

In the above embodiments, communication between the control units is performed as the inter-microcomputer communication. In other embodiments, communication between the control units may be performed via a vehicle communication network such as CAN instead of the inter-microcomputer communication.

In the above embodiments, the motor is a three-phase brushless motor. In other embodiments, the motor is not limited to a three-phase brushless motor, but may be any motor. Further, the motor is not limited to an electric motor, but may be a generator, or may be a so-called motor-generator having both functions of the motor and the generator. In the above embodiments, the inverter and motor windings are provided in two systems. In other embodiments, the number of systems, i.e., sets of inverters and motor windings, may be one or three or more. Also, the number of inverters and motor windings may be respectively different. In the above embodiments, the drive device including the detection unit is applied to the electric power steering apparatus. In other embodiments, the drive device may also be applied to other apparatuses other than the electric power steering apparatus.

The control unit described in the present disclosure and the method thereof may be realized by a dedicated computer that is configured as a combination of a processor and a memory programmed to perform one or more functions embodied by a computer program. Alternatively, the control unit described in the present disclosure and the method thereof may be realized by a dedicated computer that is provided as a configuration of a processor including one or more dedicated hardware logic circuits. Alternatively, the control unit and the method described in the present disclosure may be realized by one or more dedicated computers which is provided as a combination of (i) a processor and a memory programmed to perform one or more functions and (ii) a processor configured by one or more hardware logic circuits. Further, the computer programs mentioned above may be stored, as instructions executable by a computer, in a tangible, non-transitory, computer-readable storage medium. The present disclosure is not limited to the above embodiments, but may encompass various modifications implementable without departing from the spirit of the present disclosure.

What is claimed is:

1. A detection unit comprising:
a detection element configured to detect a change in physical quantity;
a calculator unit configured to calculate a detection value according to the physical quantity detected by the detection element;
a non-volatile storage configured to store a plurality of correction values that correspond to a detection value to correct an error of the detection value;
an abnormality determiner configured to determine whether an abnormality occurs in each of the plurality of correction values; and
a control calculator configured to perform a control calculation by using the detection value corrected by any one of the plurality of correction values upon determining that an abnormality has not occurred, wherein
the detection element includes a main element which yields the detection value having a normality determination for use in the calculation by the control calculator and a sub element which monitors the main element, and
each of the plurality of correction values is a value for correcting the error of the detection value of the main element,
the detection unit further comprising:
a sensor including a sensor storage configured to store an inter-sensor error correction value that corrects the error of the detection value among the main element and the sub element together with the main element, the sub element, and the calculator unit and
a controller including the control calculator, the non-volatile storage and the abnormality determiner, wherein
the sensor corrects the detection value of the sub element by the inter-sensor error correction value, and outputs the corrected value to the controller, each of the plurality of correction values is divided into a controller side correction value and a sensor side correction value at a predetermined ratio,
the controller side correction value is stored in the non-volatile storage, and
the sensor side correction value is stored in the sensor storage.

2. The detection unit of claim 1, wherein
the sensor and the controller receiving the detection value from the sensor are provided in plural sets,
the detection value after correction with a reference value in the sensor is output from the sensor to the controller, and
the plurality of controllers share the of the plurality of correction values by communication.

3. The detection unit of claim 1, wherein
the controller is provided in plural units, and
the plurality of correction values for the correction of the same detection value are respectively stored in the non-volatile storage of different controllers.

4. The detection unit of claim 1, wherein
the plurality of correction values for the correction of the same detection value are respectively stored as different data.

5. A method of securing detection accuracy using a detection unit, the method comprising:
detecting, using a detection element, a change in physical quantity;
calculating, using a calculator unit, a detection value according to the physical quantity detected;
storing, using a non-volatile storage, a plurality of correction values that correspond to a detection value to correct an error of the detection value;
determining, using an abnormality determiner, whether an abnormality occurs in each of the plurality of correction values; and
performing, using a control calculator, a control calculation by using the detection value corrected by any one of the plurality of correction values upon determining that an abnormality has not occurred, wherein
the detection element includes a main element which yields the detection value having a normality determination for use in the calculation by the control calculator and a sub element which monitors the main element, and
each of the plurality of correction values is a value for correcting the error of the detection value of the main element,
the detection unit further comprising:
a sensor including a sensor storage configured to store an inter-sensor error correction value that corrects the error of the detection value among the main element and the sub element together with the main element, the sub element, and the calculator unit; and
a controller including the control calculator, the non-volatile storage and the abnormality determiner, wherein
the sensor corrects the detection value of the sub element by the inter-sensor error correction value, and outputs the corrected value to the controller,
each of the plurality of correction values is divided into a controller side correction value and a sensor side correction value at a predetermined ratio,
the controller side correction value is stored in the non-volatile storage, and
the sensor side correction value is stored in the sensor storage.

6. A system for securing detection accuracy comprising:
a processor;
a non-transitory computer-readable storage medium; and
a set of computer-executable instructions stored on the non-transitory computer-readable storage medium that cause the processor to:
detecting, using a detection element, a change in physical quantity;
calculating, using a calculator unit, a detection value according to the physical quantity detected;
storing, using a non-volatile storage, a plurality of correction values that correspond to a detection value to correct an error of the detection value;
determining, using an abnormality determiner, whether an abnormality occurs in each of the plurality of correction values; and
performing, using a control calculator, a control calculation by using the detection value corrected by any one of the plurality of correction values upon determining that an abnormality has not occurred, wherein
the detection element includes a main element which yields the detection value having a normality determination for use in the calculation by the control calculator and a sub element which monitors the main element, and
each of the plurality of correction values is a value for correcting the error of the detection value of the main element,
the system further comprising:
a sensor including a sensor storage configured to store an inter-sensor error correction value that corrects the error of the detection value among the main element and the sub element together with the main element, the sub element, and the calculator unit; and
a controller including the control calculator, the non-volatile storage and the abnormality determiner, wherein
the sensor corrects the detection value of the sub element by the inter-sensor error correction value, and outputs the corrected value to the controller,
each of the plurality of correction values is divided into a controller side correction value and a sensor side correction value at a predetermined ratio,
the controller side correction value is stored in the non-volatile storage, and
the sensor side correction value is stored in the sensor storage.

* * * * *